United States Patent
Boutaghou et al.

[11] Patent Number: 6,134,076
[45] Date of Patent: Oct. 17, 2000

[54] ADJUSTMENT FEATURE FOR LOAD/ UNLOAD ALIGNMENT OF MULTIPLE DISK STACK RAMP ASSEMBLY

[75] Inventors: Zine Eddine Boutaghou, Vadnais Heights; Aric Kumaran Menon, Bloomington, both of Minn.

[73] Assignee: Seagate Technology, Inc., Scotts Valley, Calif.

[21] Appl. No.: 09/078,860

[22] Filed: May 14, 1998

Related U.S. Application Data

[60] Provisional application No. 60/069,136, Dec. 8, 1997.

[51] Int. Cl.[7] ........................................ G11B 5/54
[52] U.S. Cl. ............................................. 360/105
[58] Field of Search .............................. 360/97.01, 98.01, 360/104–106

[56] References Cited

U.S. PATENT DOCUMENTS

| | | | |
|---|---|---|---|
| 4,933,785 | 6/1990 | Morehouse et al. | 360/78.04 |
| 5,034,837 | 7/1991 | Schmitz | 360/105 |
| 5,235,482 | 8/1993 | Schmitz | 360/97.02 |
| 5,455,723 | 10/1995 | Boutaghou et al. | 360/75 |
| 5,831,795 | 11/1998 | Ma et al. | 360/105 |
| 5,870,255 | 2/1999 | Hornung et al. | 360/105 |
| 5,875,074 | 2/1999 | Ho et al. | 360/105 |

FOREIGN PATENT DOCUMENTS

| | | |
|---|---|---|
| 6-05022 | 1/1994 | Japan . |

*Primary Examiner*—Jefferson Evans
*Attorney, Agent, or Firm*—Schwegman, Lundberg, Woessner & Kluth

[57] ABSTRACT

A disk drive system includes a base, a disk stack rotatably attached to the base, and an actuator assembly movably attached to the base. A ramp assembly includes a set of ramps for loading and unloading the transducing elements to and from the disks in the disk stack. The ramp assembly is attached to the base. The ramp assembly has a series of fixed ramps which are attached to a rigid structure. The ramps have four degrees of freedom which allow for adjustability in the formation of the ramp so that the E-block or actuator formed from separate parts can move with respect to the disks and with respect to the ramps without excessive interference to load or unload the sliders which carry the transducers with respect to the disk. Each individual ramp unit is an integral part. The individual ramp units are positioned with respect to a rigid structure and then fixed into the proper position by either laser ablation, rod melt approaches, adhesives or attachment with mechanical fasteners. The individual ramp units can be properly mated with the disk stack and then finely adjusted before fixing the individual ramp units to the rigid structure. The rigid structure is a post attached to the base or housing of the disk drive. A jig or robotic fingers can be used to hold all the individual ramp units with respect to the post during assembly. A vision system can be used in conjunction with a robot to move the individual ramp units with respect to the post.

20 Claims, 6 Drawing Sheets

ADJUSTMENT FEATURE FOR LOAD/ UNLOAD ALIGNMENT OF MULTIPLE DISK STACK RAMP ASSEMBLY

RELATED APPLICATION

This application claims the benefit of U.S. Provisional Application Ser. No. 60/069,136, filed Dec. 8, 1997 under 35 USC119(e).

FIELD OF THE INVENTION

The present invention relates to the field of mass storage devices. More particularly, this invention relates to a disk drive which includes a number of ramps for loading and unloading a number of transducing heads from the surfaces of the disks in the disk drive.

BACKGROUND OF THE INVENTION

One of the key components of any computer system is a place to store data. Computer systems have many different places where data can be stored. One common place for storing massive amounts of data in a computer system is on a disk drive. The most basic parts of a disk drive are a disk that is rotated, an actuator that moves a transducer to various locations over the disk, and electrical circuitry that is used to write and read data to and from the disk. The disk drive also includes circuitry for encoding data so that it can be successfully retrieved and written to the disk surface. A microprocessor controls most of the operations of the disk drive as well as passing the data back to the requesting computer and taking data from a requesting computer for storing to the disk.

The transducer is typically housed within a small ceramic block. The small ceramic block is passed over the disk in a transducing relationship with the disk. The transducer can be used to read information representing data from the disk or write information representing data to the disk. When the disk is operating, the disk is usually spinning at relatively high RPM. These days common rotational speeds are 7200 RPM. Some rotational speeds are as high as 10,000 RPM. Higher rotational speeds are contemplated for the future. These high rotational speeds place the small ceramic block in high air speeds. The small ceramic block, also referred to as a slider, is usually aerodynamically designed so that it flies over the disk. The best performance of the disk drive results when the ceramic block is flown as closely to the surface of the disk as possible. Today's small ceramic block or slider is designed to fly on a very thin layer of gas or air. In operation, the distance between the small ceramic block and the disk is very small. Currently "fly" heights are about 12 micro inches. In some disk drives, the ceramic block does not fly on a cushion of air but rather passes through a layer of lubricant on the disk.

Information representative of data is stored on the surface of the memory disk. Disk drive systems read and write information stored on tracks on memory disks. Transducers, in the form of read/write heads, located on both sides of the memory disk, read and write information on the memory disks when the transducers are accurately positioned over one of the designated tracks on the surface of the memory disk. The transducer is also said to be moved to a target track. As the memory disk spins and the read/write head is accurately positioned above a target track, the read/write head can store data onto a track by writing information representative of data onto the memory disk. Similarly, reading data on a memory disk is accomplished by positioning the read/write head above a target track and reading the stored material on the memory disk. To write on or read from different tracks, the read/write head is moved radially across the tracks to a selected target track. The data is divided or grouped together on the tracks. In some disk drives, the tracks are a multiplicity of concentric circular tracks. In other disk drives, a continuous spiral is one track on one side of a disk drive. Servo feedback information is used to accurately locate the transducer. The actuator assembly is moved to the required position and held very accurately during a read or write operation using the servo information.

One of the most critical times during the operation of a disk drive is just before the disk drive shuts down. The small ceramic block is typically flying over the disk at a very low height when shutdown occurs. In the past, the small block was moved to a non data area of the disk where it literally landed and skidded to a stop. Problems arise in such a system. When disks were formed with a smooth surface, stiction results between the small ceramic block and the disk surface. In some instances, the force due to stiction are large enough that the head would be virtually ripped away from the suspension. Amongst the other problems was the limited life of the disk drive. Each time the drive was turned off another start stop contact cycle would result. After many start stop contacts, the small ceramic block may chip or produce particles. The particles could eventually cause the disk drive to fail. When shutting down a disk drive, several steps are taken to help insure that the data on the disk is preserved. In general, the actuator assembly is moved so that the transducers do not land on the portion of the disk that contains data. There are many ways to accomplish this. A ramp on the edge of the disk is one design method that has gained industry favor more recently. Disk drives with ramps are well known in the art. U.S. Pat. No. 4,933,785 issued to Morehouse et al. is one such design. Other disk drive designs having ramps therein are shown in U.S. Pat. Nos. 5,455,723, 5,235,482 and 5,034,837.

Typically, the ramp is positioned to the side of the disk. A portion of the ramp is positioned over the disk itself. In operation, before power is actually shut off, the actuator assembly swings the suspension, slider and transducer to a park position on the ramp. When the actuator assembly is moved to a position where parts of the suspension are positioned on the top of the ramp, the sliders or ceramic blocks do not contact the disk. Commonly, this procedure is referred to as unloading the heads. Unloading the heads helps to insure that data on the disk is preserved since, at times, unwanted contact between the slider and the disk results in data loss on the disk. The actuator assembly may be provided with a separate tang associated with each head suspension. The tang may ride up and down the ramp surface. In other drives, the ramp may be positioned such that the suspension rides up and down the ramp to unload and load the disk or disks of the disk drive.

Many of the disk drives that feature ramps have one or two disks. Tolerances were not a major problem in such designs since there was not much variation in the tolerances associated with the various components, namely the disk stack, the disks, the ramp or the suspension. In other words, in the one and two disk stack disk drive designs, the tolerances could be controlled so that the various components fit together without problems.

There is a constant trend in the disk drive industry toward higher capacity magnetic disk memory. To attain higher capacity, drives are now being populated with multiple stacked disks. Track densities and total data capacity can be increased using highly polished, smooth disks. The higher number of disks generally have to be placed within the same dimension as a lower number of disks. Thus, interdisk spacing gets smaller and smaller. Furthermore, more disks means more parts and therefore the tolerances associated with each of the separate parts can add up to provide for wide variance for the various dimensions of the disk stack.

To use the smooth disks in a multidisk stack, there is a need for a ramp structure that can be used to load transducers to the disk and unload transducers from the disk. Each disk surface requires a ramp. A load/unload structure must therefore be formed having multiple ramps which are registered to the disk surfaces of each disk in the disk stack. Many of the components of the drive are made from separate parts. As mentioned previously, the disk stack is formed from many parts which each have a separate tolerance. Individual disks are stacked on a hub. Spacers are used between the disks. The hub, disk spacers and disks each are formed within a specified tolerance. These tolerances can stack up differently for each disk stack assembly. Other components made from separate parts, can also have stack up tolerances. These other components may include the load/unload mechanism, and the E-block of the actuator which holds all the separate head gimbal assemblies.

Overcoming tolerance problems is a constant problem faced in designing and assembling disk drives. The placement of ramps near the disks is one area of the drive where potential tolerance mismatches due to tolerance stack up from several components within the disk drive may cause problems. When the actuator moves E-block to unload the sliders from the disks or to load the sliders onto the disks in the drive, three components must meet. Namely the actuator E-block, the load and unload structure (typically a ramp assembly), and the disk stack. Each of the three may have a potential stack up tolerance which could result in a mismatch with respect to the other components.

A tolerance mismatch between the any of the three separate components with separate stack up tolerances would result in the components not fitting with one another or an interference between components. For example, a suspension attached to an arm of the actuator may strike the end of a ramp rather than ride up the ramp surface. In this case, all the sliders and the transducers held by the sliders would not be able to be parked off the surface of the disk. Another example would be to allow the actuator E-block and the sliders and transducers attached to the E-block to move with respect to the disks and the ramps, but to do so with excessive interference. In other words, the actuator could move the E-block as intended but with less than optimal efficiency.

In order to insure that the actuator can move the E-block with respect to the disk and the ramp as intended, it appears that there is a need for a system which has some adjustability in one or more of the parts. This is further necessary in light of the fact that as interdisk spacing gets smaller, the tolerances associated with the disk stack are becoming tighter. In addition, the components are becoming much more sensitive to slight shock loading or to thermal effects. The small ceramic blocks which contain a transducer are now smaller than ever before. Gimbal springs must allow for gimballing of the small ceramic blocks and are therefore much more sensitive to slight shock loading. A slight shock load can effect a suspension so that the z-height may be off slightly. Similarly, small tilt angles can result in the arms of the actuator. Since the components are more sensitive to such changes, it is necessary to also allow for some adjustability in one or more components of the actuator.

SUMMARY OF THE INVENTION

A disk drive system includes a base, a disk stack rotatably attached to the base, and an actuator assembly movably attached to the base. A ramp assembly includes a set of ramps for loading and unloading the transducing elements to and from the disks in the disk stack. The ramp assembly is attached to the base. The ramp assembly has a series of fixed ramps which are attached to a rigid structure. The ramps have four degrees of freedom which allow for adjustability in the formation of the ramp so that the E-block or actuator formed from separate parts can move with respect to the disks and with respect to the ramps without excessive interference to load or unload the sliders which carry the transducers with respect to the disk. Each individual ramp unit is an integral part. The individual ramp units are positioned with respect to a rigid structure and then fixed into the proper position by either laser ablation, rod melt approaches, adhesives or attachment with mechanical fasteners. The individual ramp units can be properly mated with the disk stack and then finely adjusted before fixing the individual ramp units to the rigid structure. The rigid structure is a post attached to the base or housing of the disk drive. The individual ramp units can be rotated with respect to the post, tilted with respect to the post, moved with respect to the post in an axial direction with respect to the disk, and in the z-height direction during the fine adjustment stage of assembly of the disk drive.

A jig can be used to hold all the individual ramp units with respect to the post. The jig may be part of a robotic system which moves the individual ramp units to correct for system tilt, z-height, and axial positioning inaccuracies. A vision system can be used in conjunction with the jig to determine the system tilt, z-height, and axial positioning inaccuracies and to provide a feedback control loop to determine when the inaccuracies have been corrected. A vision system can also be used to dispense a proper amount of adhesive to the proper position for bonding the individual ramp units and the post. Other techniques may be used to fix the individual ramp units to the post, such as rod melt, laser ablation, and mechanical attachment. The vision system would be needed for laser ablation.

Advantageously, such a system allows the adjustability necessary for proper mating between the ramp structure and the multidisk stack. The ramp structure made of adjustable individual ramp units affixed to a post would also allow for efficient movement of an actuator having a plurality of arms, load beams and transducers, with respect to the resulting ramp structure and to the multidisk stack. Such an adjustable system prevents problems due to tolerance mismatch between components since the ramp structure can be adjusted to accommodate the tolerance mismatches of other components. Assembly is eased from the standpoint of accommodating mismatches between parts. This system provides load and unload capability to drives having a multidisk disk stack.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
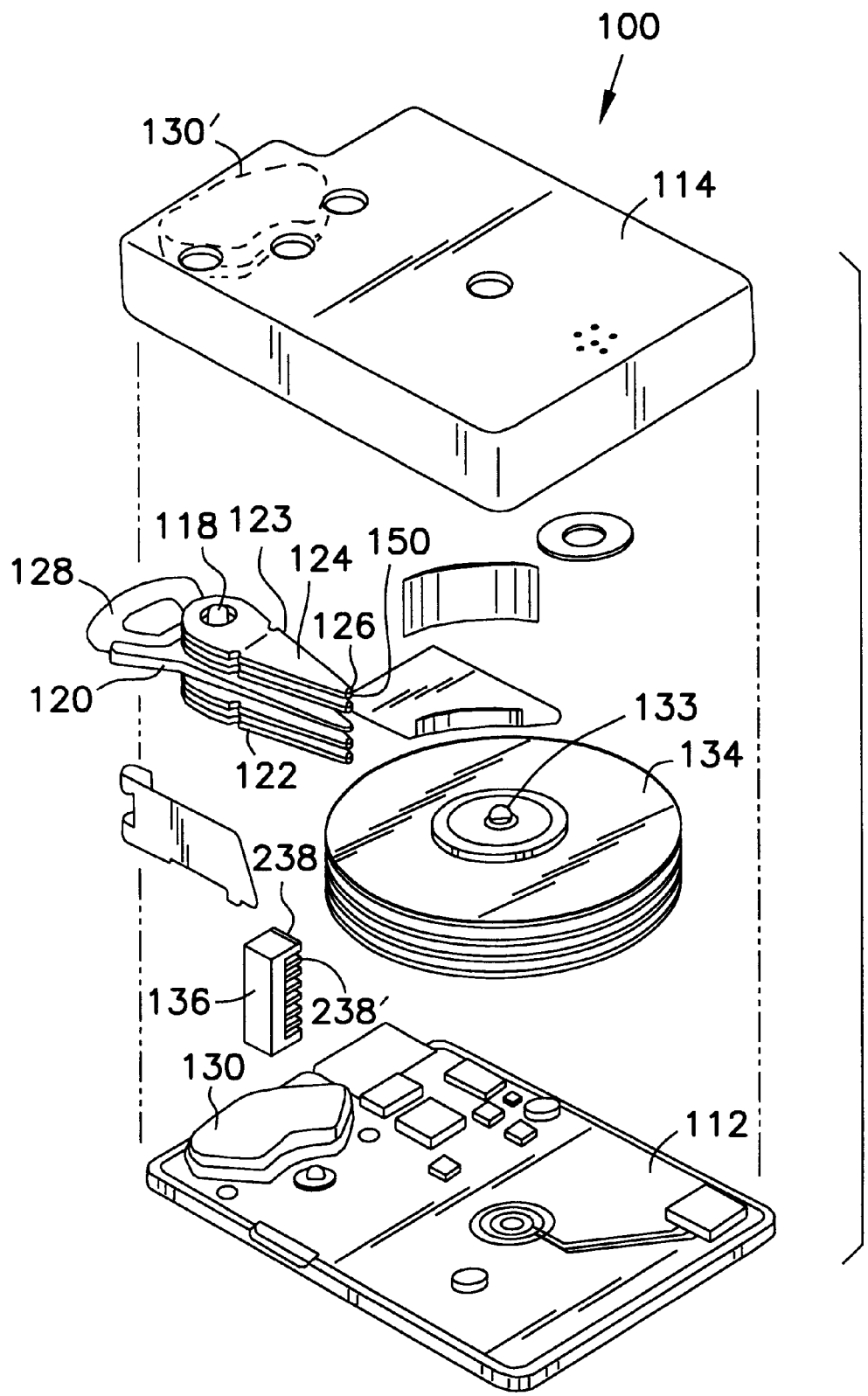
FIG. 1 is an exploded view of a disk drive with a multiple disk stack and a ramp assembly for loading and unloading transducers to and from the surfaces of the disks.

The invention described in this application is useful with all mechanical configurations of disk drives having either rotary or linear actuation. In addition, the invention is also useful in all types of disk drives including hard disk drives, zip drives, floppy disk drives and any other type of drives where unloading the transducer from a surface and parking the transducer may be desirable. FIG. 1 is an exploded view of one type of a disk drive 100 having a rotary actuator. The disk drive 100 includes a housing 112, and a housing cover 114. The housing or base 112 and housing cover 114 form a disk enclosure. Rotatably attached to the housing 112 on an actuator shaft 118 is an actuator assembly 120. The actuator assembly 120 includes a comb-like structure 122 having a plurality of arms 123. Attached to the separate arms 123 on the comb 122, are load beams or load springs 124. Load beams or load springs are also referred to as suspensions. Attached at the end of each load spring 124 is a slider 126 which carries a magnetic transducer 150. The slider 126 with the transducer 150 form what is many times called the head. It should be noted that many sliders have one transducer 150 and that is what is shown in the figures. It should also be noted that this invention is equally applicable to sliders having more than one transducer, such as what is referred to as an MR or magneto resistive head in which one transducer 150 is generally used for reading and another is generally used for writing. On the end of the actuator arm assembly 120 opposite the load springs 124 and the sliders 126 is a voice coil 128.

Attached to the housing 112 is one of a pair of magnets 130. The other of the pair of magnets 130' is attached to the housing cover 114. The pair of magnets 130 and 130', and the voice coil 128 are key parts of a voice coil motor which applies a force to the actuator assembly 120 to rotate it about the actuator shaft 118. Also mounted to the housing 112 is a spindle motor and spindle hub 133. The spindle motor is an "in hub" motor which means the motor fits within the spindle hub 133. The spindle motor rotates the spindle hub. In FIG. 1, a number of disks 134 are attached to the spindle hub 133. In other disk drives a single disk or a different number of disks may be attached to the hub. The invention described herein is equally applicable to such other disk drives.

Figure 2A:
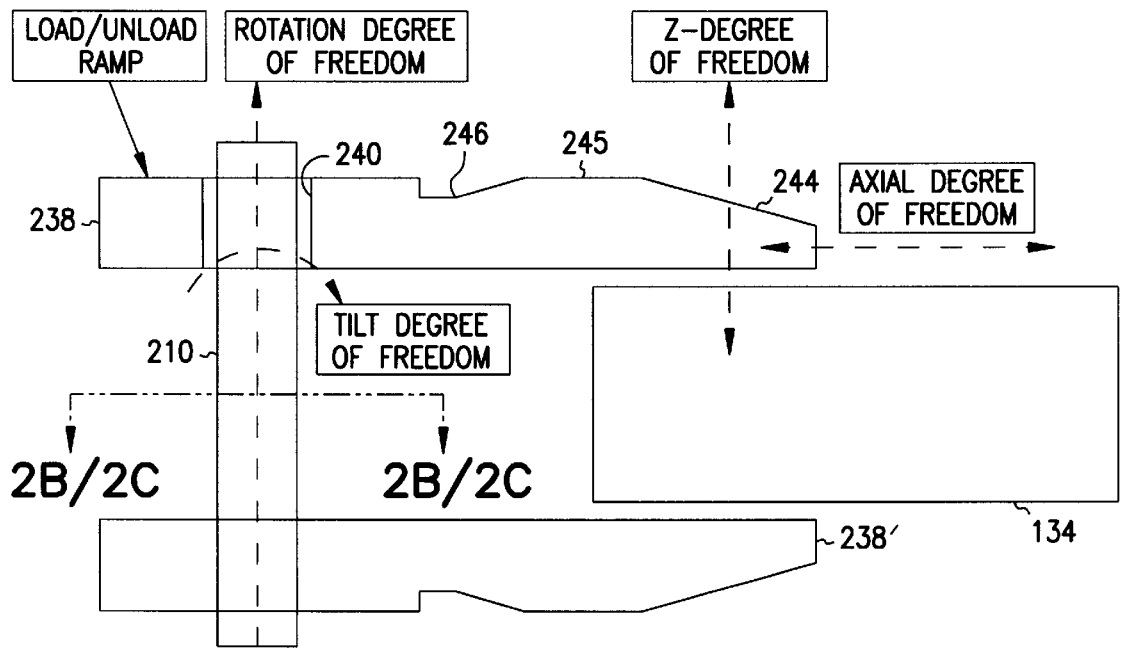
FIG. 2A is a side view of a post and an unattached individual ramp unit.
Figure 2B:
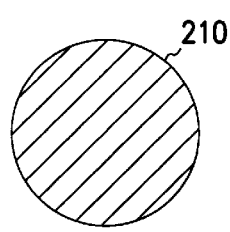
FIGS. 2B and 2C are cross section views of the post.
Figure 2C:
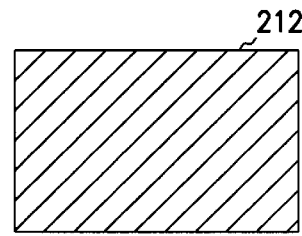

Also attached to the housing 112 is a ramp structure 136. FIG. 2A is a side view of a post and an unattached individual ramp unit which make up a portion of the ramp structure 136 shown in FIG. 1. Now looking at FIG. 2A, the ramp structure 136 will be described in more detail. The ramp structure 136 is comprised of a rigid structure 210 and individual ramp units 238. The rigid structure is actually a post 210 which is rigidly attached to the base or housing 112 of the disk drive 100. The cross section of the post 210 may be circular as shown in FIG. 2B, square 212 as shown in FIG. 2C, or of any other geometric shape. Individual ramp units 238 and 238' each include an inclined surface 244, a parking detent 246, and flat surface 245 between the inclined surface 244 and the parking detent 246. The inclined surface is on one end of the individual ramp unit 238. The other end of the individual ramp structure 238, 238' has an opening 240 therein which receives the post 210. The opening 240 in the individual ramp unit 238, 238' is sized to allow several degrees of freedom for the individual ramp unit 238, 238'. The individual ramp unit, such as 238, is placed on the post 210 and adjusted through its several degrees of freedom. The individual ramp unit 238 is adjusted for tilt to make the surface of the ramp nearest the disk 134 substantially parallel to the surface of the disk 134. The individual ramp unit 238 is also moved in the axial direction so that it is properly placed in the axial direction. In other words, the position of the end of the individual ramp unit 238 is positioned so that it does not extend too far in along an axial direction with respect to the disk. If an individual ramp unit 238 extends too far into the disk, the tracks at the outer radius may not be usable. The tracks at the outer radius of the disk 134 hold the most data and are therefore considered very key to achieving a large capacity on the disk drive. The individual ramp unit 238 can also be rotated about the post 210 so that it is aligned at a selected angle. The individual ramp unit 238 can also be adjusted in the z-direction so that the ramp is at a selected distance above the surface of the disk 134. The post 210 shown in FIG. 2A can be modified to limit certain degrees of freedom for adjusting the placement of the individual ramp unit 238 with respect to the post 210. For example, the post 210 could have a square cross section so as to limit the rotational degree of freedom. Once the individual ramp unit 238 is located at the desired z-height location, tilt, and axial location, the individual ramp unit 238 can be permanently affixed 242 to the rigid structure or post 210. It should be noted that one individual ramp unit 238 is associated with each surface of the disk to which information representing data will be written or read. Only one disk 134 is shown in FIG. 2A for the sake of clarity. Therefore, only two individual ramp units 238 and 238' are shown. There is an individual ramp unit 238 for the top surface of a disk and an individual ramp unit 238' for a bottom surface of the disk 134. The individual ramp units 238 and 238' are for the loading and unloading the slider 126 which carries the transducer 150 from a surface of the disk 134. The disk drive shown in. It should be noted that this invention could also be used on ramps that rotate in and out of a load/unload position.

Figure 3:
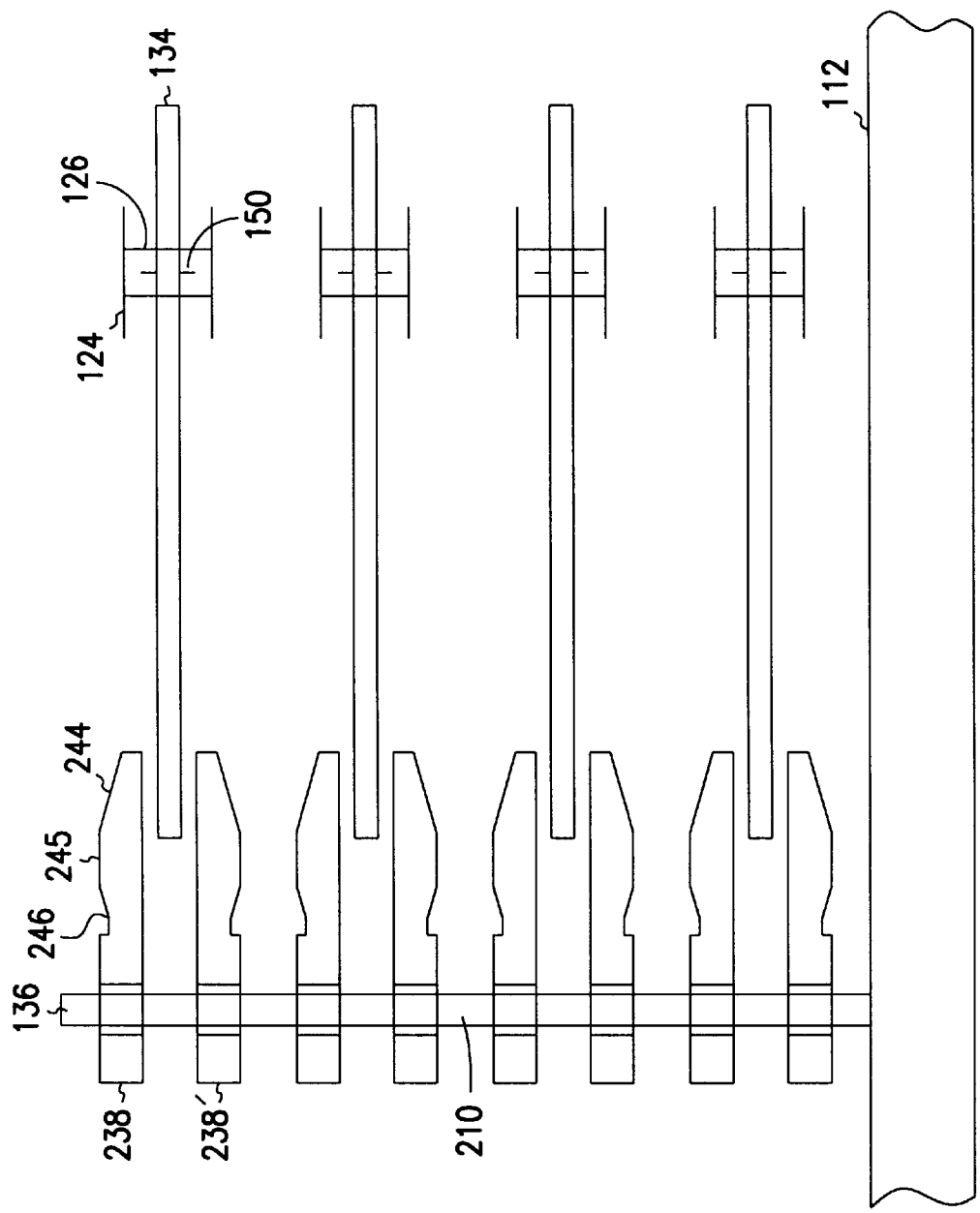
FIG. 3 is a side view of an assembled ramp structure.

FIG. 3 is a side view of an assembled ramp structure 136 showing the rigid post structure 210 and four disks, one of which is labeled 134, and eight ramps, two of which are labeled 238 and 238'. As shown in FIG. 3, the eight individual ramp units 238, 238' have been attached to the post 210. The individual ramp units 238 and 238' are all properly positioned so that the load springs 124 or the load tangs 152 attached to the load springs will engage the inclined surface 244 of each individual ramp unit 210 and to the parking detent 246.

Also shown in FIG. 3 are the load springs 124 or suspensions and the attached load tangs 152 attached to the load springs 124. The slider 124 carries the transducer 150. All the load springs 124 and tangs 152 are attached to the actuator. Moving the actuator moves all the load springs 124 and load tangs 152. In operation, the actuator is moved to a park position when the disk drive is powered down. Moving the actuator to the park position causes the load tangs 152 associated with each load spring 124 to ride up the ramp 238 or 238' associated with the surface of the disk. This is referred to as unloading the disk. When the disk drive is powered on, the actuator moves to an operating position by moving the load springs 124, load tangs 152, sliders and transducers off their respective ramps 238 or 238' into a transducing position over the surface of the disk 134. This is referred to as loading the disk.

Figure 4:
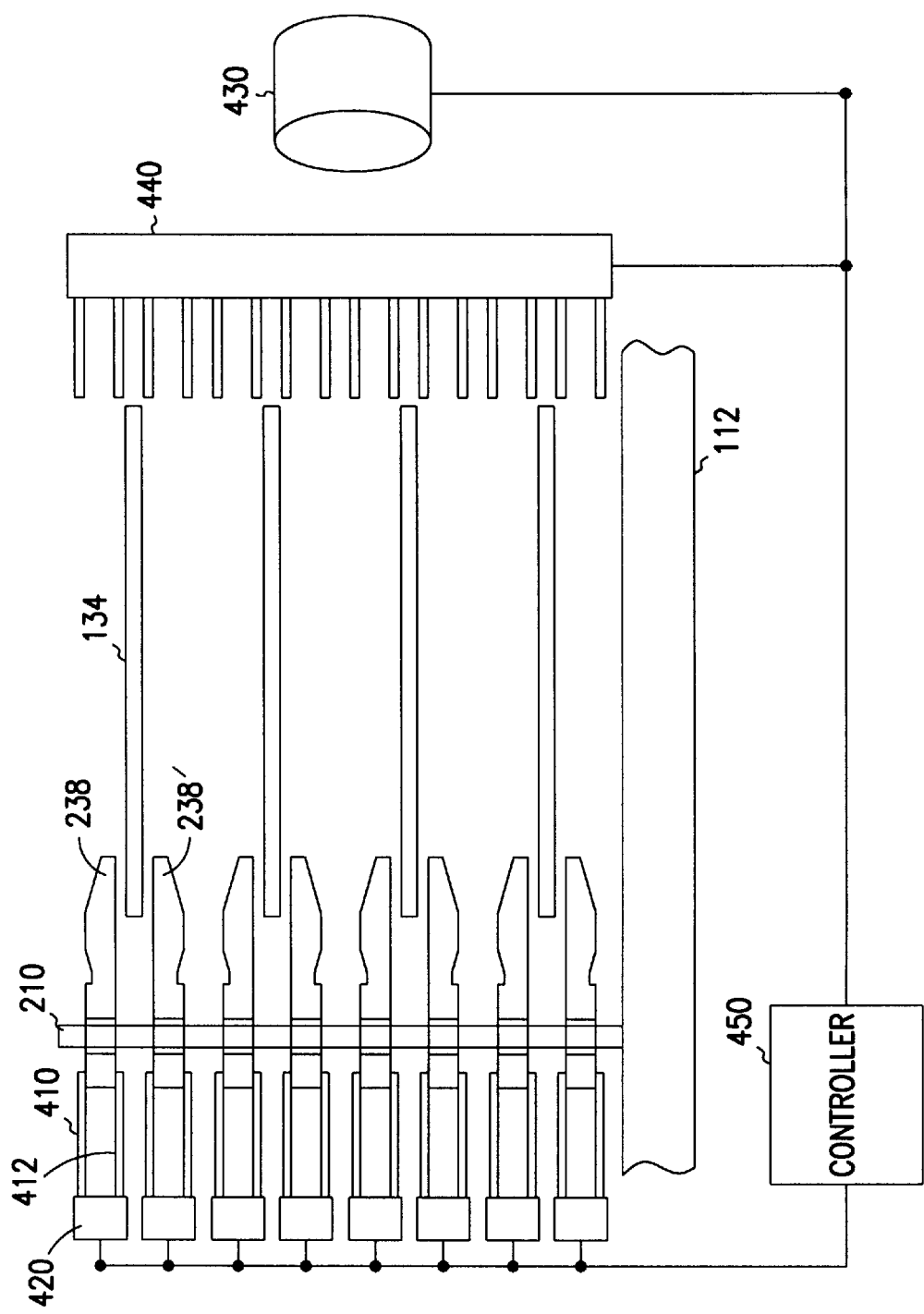
FIG. 4 is a schematic view of an assembly system for assembling the ramp structure from the post and individual ramp units.

FIG. 4 is a schematic view of an assembly system 400 for assembling the ramp structure from the post and individual ramp units. Each individual ramp unit 238 and 238' is held in position by a corresponding set of fingers 410 and 412. The fingers 410 and 412 are attached to a servo system 420 which can move an individual ramp unit 238 or 238' to adjust it for tilt, height, and axial positioning. A visioning system 430 uses several reference points, such as the surface of the disk to adjust for z-height and tilt of the individual ramp unit 238 or 238', and the outer edge of the disk 134 to adjust the individual ramp unit 238 or 238 for axial positioning. The visioning system 430 outputs signals to the servo system 420 attached to the set of fingers to move the individual ramp unit 238 or 238' to a new adjusted position. The visioning system 430 then rechecks the adjusted position to make sure that the individual ramp unit 238 or 238'0 is properly positioned. In short, the visioning system 430 acts as a feedback control loop for the servo system 420 which moves the individual ramp unit 238 or 238' via fingers 410 and 412. Once the individual ramp unit 238 or 238' is properly positioned, the visioning system may be called on again to provide the exact location of the individual ramp unit 238 or 238' and the post 210. The exact location is needed to attach the individual ramp unit 238 or 238' to the post 210. An attachment mechanism 440, such as an adhesive dispensing system or a set of lasers, can then be used to attach the individual ramp unit 238 and post 210. An adhesive dispensing unit places an adhesive at the juncture between the ramp 238 and the post 210. A laser directed at the juncture between the ramp 238 and the post 210 laser welds the individual ramp unit 238 to the post 210. Of course, other methods can be used to affix the individual ramp unit 238 and post 210, such as mechanical attachment using fasteners, rivets or friction, or such as rod melt approaches. Rod melt approaches entail applying heat to a plastic rod with either a laser or other heat source. When the plastic rod cools, the individual ramp units are held in the desired position. The fingers 410 and 412 and the servo units are attached to a controller 450. The attachment mechanism 440 is also attached to the controller 450. The controller moves the fingers 410, 412 by passing signals to the servo units 420. The controller also controls movement of the attachment mechanism 440. The vision system 430 provides input signals to the controller 450. The input signal of vision system 430 is a part of a feedback control loop which is necessary to have closed loop control of the movement of the ramps 238, 238' and the attachment mechanism 440.

Figure 5:
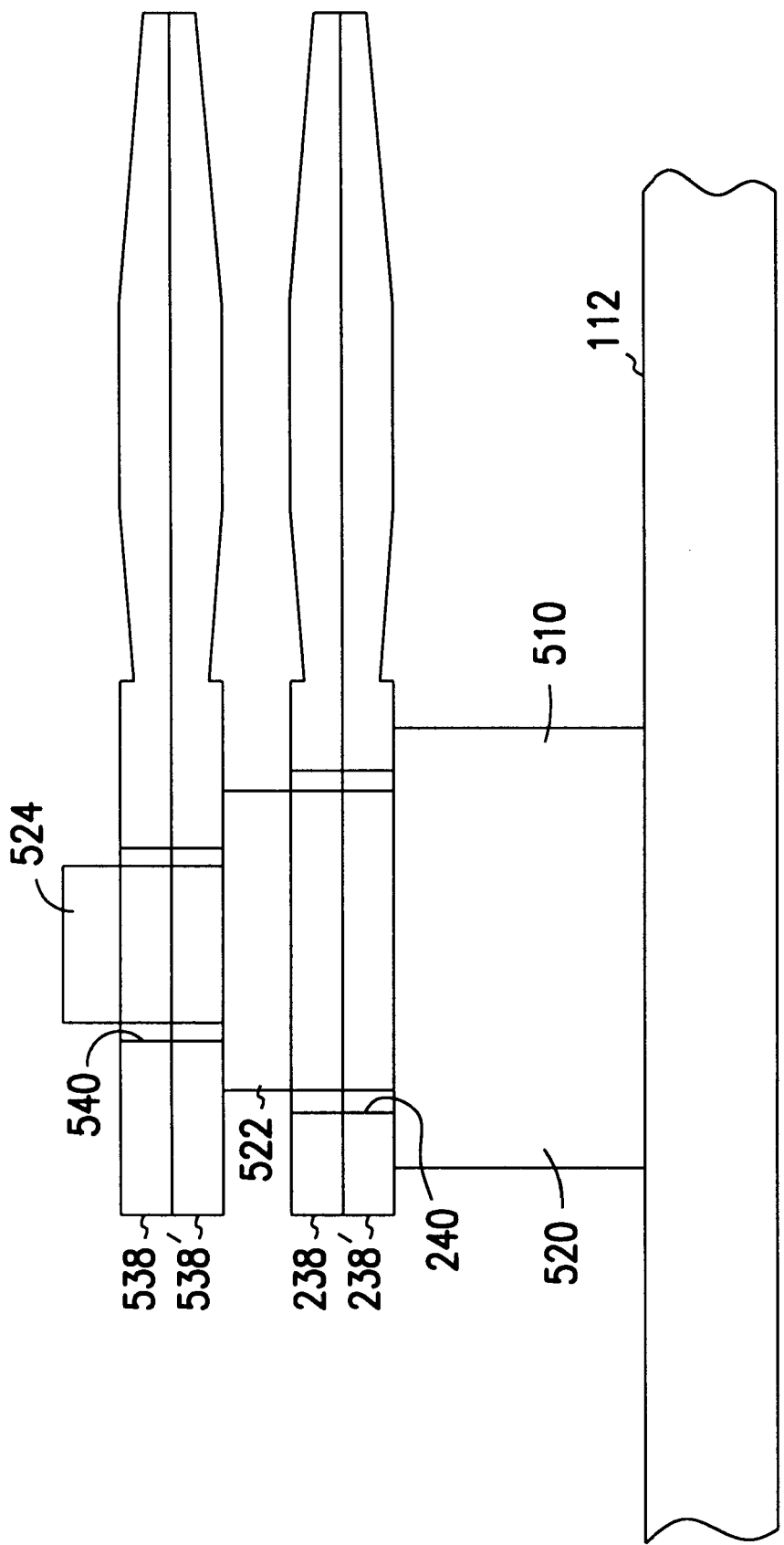
FIG. 5 is a side view of another post having features that enable ease of positioning of the individual ramp units during assembly.

FIG. 5 is a side view of another embodiment of this invention in which the post 510 has features that enable ease of positioning of the individual ramp units during assembly. The post 510 is formed in sections with each section receiving a pair of individual ramp units 238 and 238'. The first section 520 has a first diameter which is larger than the opening 240 in the individual ramp unit 238 or 238'. The section 522 has a second diameter which is small enough so as to receive the pair of individual ramp units 238 and 238'. The third section 524 has a third diameter which is smaller than the second diameter. The third section 524 receives another pair of individual ramp units 538 and 538'. The individual ramp units 538 and 538' differ from the individual ramp units 238 and 238' only in that the openings 540 in the individual ramp units 538 and 538' have a diameter which is smaller than the diameter of the openings 240 in the individual ramp units 238 and 238'. The result is that the individual ramp units 538 and 538' will fit on the third section 524 and not on the second section 522. The individual ramp units 238 and 238' will fit on the second section 522 and presumably be too big on the third section. Each section 522 and 524 will have a set of individual ramp units 238, 238', and 538, 538', in a preliminary position which is closer to the final position in the resulting ramp structure 136. The assembly will be accomplished in much the same way as described with respect to FIG. 4.

Advantageously, ramp structures 136 can be used in disk drives having multidisk stacks. The adjustable individual ramp units 238 and 238' of the first embodiment, or the adjustable individual ramp units 238, 238' and 538, 538' of the second embodiment allow for tilt adjustment, z-height adjustment and tilt adjustment of the individual ramp units 238, 238' and 538, 538' with respect to the post 210 or 510. Since the individual ramp units can be adjusted, the ramp structure can be adjusted to correct for system tilt, z-height differences, and axial positioning inaccuracies that may occur due to stack up tolerances on other components of the disk drive 100.

Figure 6:
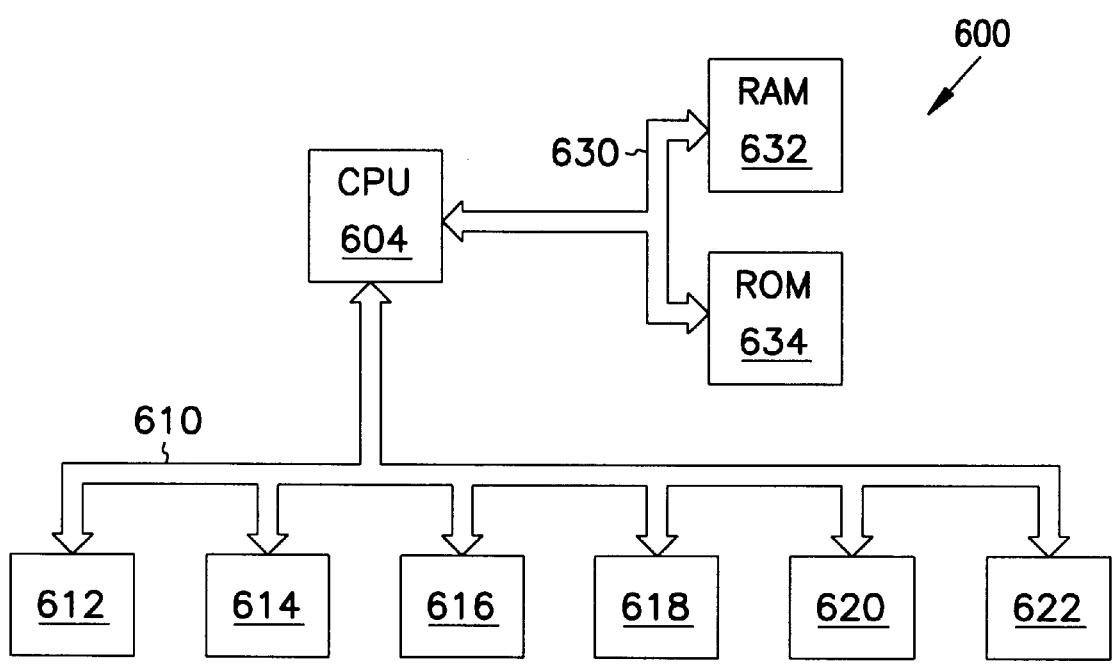
FIG. 6 is a schematic view of an information handling system.

FIG. 6 is a schematic view of a computer system. Advantageously, the invention is well-suited for use in a computer system 600. The computer system 600 may also be called an electronic system or an information handling system and includes a central processing unit, a memory and a system bus. The information handling system includes a central processing unit 604, a random access memory 632, and a system bus 630 for communicatively coupling the central processing unit 604 and the random access memory 632. The information handling system 602 includes a disk drive device which includes the ramp described above. The information handling system 602 may also include an input/output bus 610 and several devices peripheral devices, such as 612, 614, 616, 618, 620, and 622 may be attached to the input output bus 610. Peripheral devices may include hard disk drives, magneto optical drives, floppy disk drives, monitors, keyboards and other such peripherals. Any type of disk drive may use the ramp having particles 300 molded therein.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A magnetic disk drive comprising:

a transducer;

a disk;

an arm for carrying said transducer in transducing relation with respect to said disk;

a ramp structure for loading and unloading the arm and transducer from said disk, said ramp structure including individual ramp units; and means for providing several degrees of freedom to adjust the individual ramp units.

2. The magnetic disk drive of claim 1 further comprising:

a rigid structure; and means for affixing the individual ramp units to the rigid structure.

3. A magnetic disk drive comprising:

a transducer;

a disk;

an arm;

a load spring attached to said arm, said load spring and arm carrying said transducer in transducing relation with respect to said disk;

a ramp structure for loading and unloading the arm, said ramp having several degrees of freedom to adjust after the load spring is moved to a park position atop said ramp.

4. The magnetic disk drive of claim 3 wherein the ramp structure further comprises:

a post; and an individual ramp unit having an opening therein, said opening of sufficient size to receive said post.

5. The magnetic disk drive of claim 4 wherein the post has a circular cross section.

6. The magnetic disk drive of claim 4 wherein the post has a rectangular cross section.

7. The magnetic disk drive of claim 4 wherein the post has features which limit the adjustability of the individual ramp unit with respect to the post.

8. A magnetic disk drive comprising:

a transducer;

a disk;

an arm;

a load spring attached to said arm, said load spring and ann carrying said transducer in transducing relation with respect to said disk;

a ramp structure for loading and unloading the arm, said ramp being adjustable after the load spring is moved to a park position atop said ramp, said ramp including a post; and an individual ramp unit having an opening therein, said opening of sufficient size to receive said post, said post including a first section with a first diameter for receiving a first set of individual ramp units; and a second section with a second diameter for receiving a second set of individual ramp units.

9. A ramp structure for a disk drive having a multiple disk stack, comprising:

a post; and an individual ramp unit having an opening therein for receiving said post, said individual ramp unit having several degrees of freedom to adjust with respect to said post.

10. The ramp structure of claim 9 wherein the post is a rigid structure.

11. The ramp structure of claim 9 wherein the post is a meltable structure for fastening the individual ramp unit to said post.

12. The ramp structure of claim 9 further comprising a fastener for fastening the individual ramp unit to said post.

13. An information handling system comprising:

a base;

a disk rotatably attached to said base; and an actuator assembly movably attached to said base said actuator assembly further comprising a transducer attached to said actuator, said actuator moving the transducer between a transducing position and a park position; and a ramp structure attached to said base, said ramp structure further comprising:

a post; and an individual ramp unit having an opening therein for receiving said post, said individual ramp having several degrees of freedom to adjust with respect to said post.

14. The information handling system of claim 13 further comprising a fastener for fastening the individual ramp unit to said post.

15. A method for assembling a disk drive having a multiple disk stack and a ramp structure having a post and individual ramp units, said assembly method comprising in order the steps of:

adjusting the individual adjustable ramp units to a selected position with respect to the post; and affixing the individual ramp units to the post.

16. The method of claim 15 wherein the step of adjusting the individual ramp units to selected position with respect to the post further comprises the step of adjusting the individual ramp units by referencing a disk in the disk stack.

17. A method for assembling a disk drive having a multiple disk stack and a ramp structure having a post and individual ramp units said assembly method comprising the steps of:

attaching a robotic system to the individual ramp unit;

moving the individual ramp unit using a servo system associated with the robotic system; and affixing the individual ramp units to the post.

18. A method for assembling a disk drive having a multiple disk stack and a ramp structure having a post and individual ramp units, said assembly method comprising the steps of:

attaching a robotic system to the individual ramp unit;

moving the individual ramp unit using a servo system associated with the robotic system;

providing feedback to said servo system with a vision system; and affixing the individual ramp units to the post.

19. A method for assembling a disk drive having a multiple disk stack and a ramp structure having a post and individual ramp units, said assembly method comprising the steps of:

directing a laser at the junction between the post and the individual ramp unit; and affixing the individual ramp units to the post.

20. A method for assembling a disk drive having a multiple disk stack and a ramp structure having a post and individual ramp units, said assembly method comprising the steps of:

dispensing an adhesive to the junction between the post and the individual ramp unit; and affixing the individual ramp units to the post.

* * * * *